United States Patent [19]

Kalke

[11] 4,050,593

[45] Sept. 27, 1977

[54] SIDE LIFT FOR SIDE DUMPING WAGONS

[76] Inventor: Henry J. Kalke, Rte. 1, Box 24 12-6th St., NE., Nora Springs, Iowa 50458

[21] Appl. No.: 660,144

[22] Filed: Feb. 23, 1976

[51] Int. Cl.² .............................................. B65G 67/42
[52] U.S. Cl. .................................. 214/44 C; 214/46.3
[58] Field of Search ................ 214/42 A, 42 R, 44 C, 214/44 R, 45, 46.3, 46.34

[56] References Cited

U.S. PATENT DOCUMENTS

| | | | |
|---|---|---|---|
| 1,354,038 | 9/1920 | George et al. | 214/46.34 |
| 1,420,856 | 3/1921 | McGlauflin | 214/46.34 |
| 2,411,228 | 11/1946 | Poulsen | 214/46.3 |
| 2,642,198 | 6/1953 | German | 214/46.34 |
| 2,895,762 | 7/1959 | Seving | 214/46.34 X |

FOREIGN PATENT DOCUMENTS

| | | | |
|---|---|---|---|
| 2,435,085 | 2/1976 | Germany | 214/44 C |
| 22,599 of | 1909 | United Kingdom | 214/44 C |

*Primary Examiner*—Albert J. Makay
*Assistant Examiner*—Carl Rowold

*Attorney, Agent, or Firm*—Clarence A. O'Brien; Harvey B. Jacobson

[57] ABSTRACT

A support structure is provided including elevated front and rear support portions from which a pair of depending tension members are supported. An elongated horizontal lift member is supported at its opposite ends from the lower ends of the tension members and motor structure is provided and operatively connected between the support structure and tension members for selectively elevating and lowering the lower ends of the tension members relative to the support structure support portions and thereby elevating and lowering the lift member. The lift member is adapted to rest upon a horizontal support surface and to have the front and rear wheels on one side of a side dumping wagon rolled thereonto and thereoff when the lift member is disposed at least substantially at the level of the support surface. In this manner, the side of a side dumping wagon remote from the side thereof to which the discharge chute of the wagon opens may be elevated relative to the discharge chute side of the wagon in order to enable the side dumping wagon to be more quickly and completely emptied through the side discharge chute thereof.

9 Claims, 4 Drawing Figures

SIDE LIFT FOR SIDE DUMPING WAGONS

BACKGROUND OF THE INVENTION

Various farm equipment manufacturers produce and market side dumping wagons including hopper bottom equipped load boxes provided with side discharge chutes. These wagons may be utilized to transport grain and other fluent materials and function to discharge the grain or other fluent material therein from the side of the wagon when the side discharge chute of the wagon is opened. However, humidity conditions and other factors often tend to allow farm grains and other fluent materials to achieve angles of repose greater than the angled inner surfaces of the hopper bottoms of side dumping wagons with the result that the entire load of grain or other fluent material may not be gravity discharged through the discharge chute of the wagon. When this occurs it is necessary for the hopper bottom walls to be vibrated or for a workman to reach down into the interior of the wagon with a tool for dislodging grain or other fluent material clinging to the inner surfaces of the hopper bottom. This, of course, results in wasted time in useful operation of the associated farm equipment as well as lost man hours.

BRIEF DESCRIPTION OF THE INVENTION

The lift of the instant invention has been designed for the purpose of tilting a side dumping wagon toward the side thereof equipped with a gravity discharge chute. In this manner, the inclined surfaces of the hopper bottom of the wagon are disposed at a greater inclination relative to the horizontal and the tendency of grain and other fluent materials to cling to the inner surfaces of the hopper bottom of the side dumping wagon is at least substantially eliminated resulting in a savings of otherwise lost effective farm equipment operating time and otherwise expended man work hours.

The lift includes an elongated horizontal lift member which may be disposed on the ground and have the front and rear side wheels of a side dumping wagon remote from the side thereof equipped with a gravity discharge chute rolled thereonto. The lift includes structure for raising the elongated lift member and thus elevating the side of an associated side dumping wagon remote from the gravity discharge chute thereof. After the wagon has been emptied by gravity, the lift member may again be lowered to the ground and the wagon may be rolled off the end of the lift member remote from the end thereof onto which the wagon was rolled.

The main object of this invention is to provide a lift for supporting and elevating the front and rear wheels of a side dumping wagon on the side thereof remote from the gravity discharge chute of the wagon.

Another object of this invention, in accordance with the immediately preceding object, is to provide a lift onto which and from which an associated side dumping wagon may be readily rolled.

Yet another object of this invention is to provide a lift of the type enabling a side dumping wagon to be advanced onto the lift upon movement in one direction and subsequently moved off the lift by movement in the same direction.

Another important object of this invention is to provide a lift which may be readily actuated by the operator of a tractor utilized to pull the side dumping wagon onto the lift and with very little time lost by operation of the lift during the dumping operation.

A final object of this invention to be specifically enumerated herein is to provide a side dumping wagon lift which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
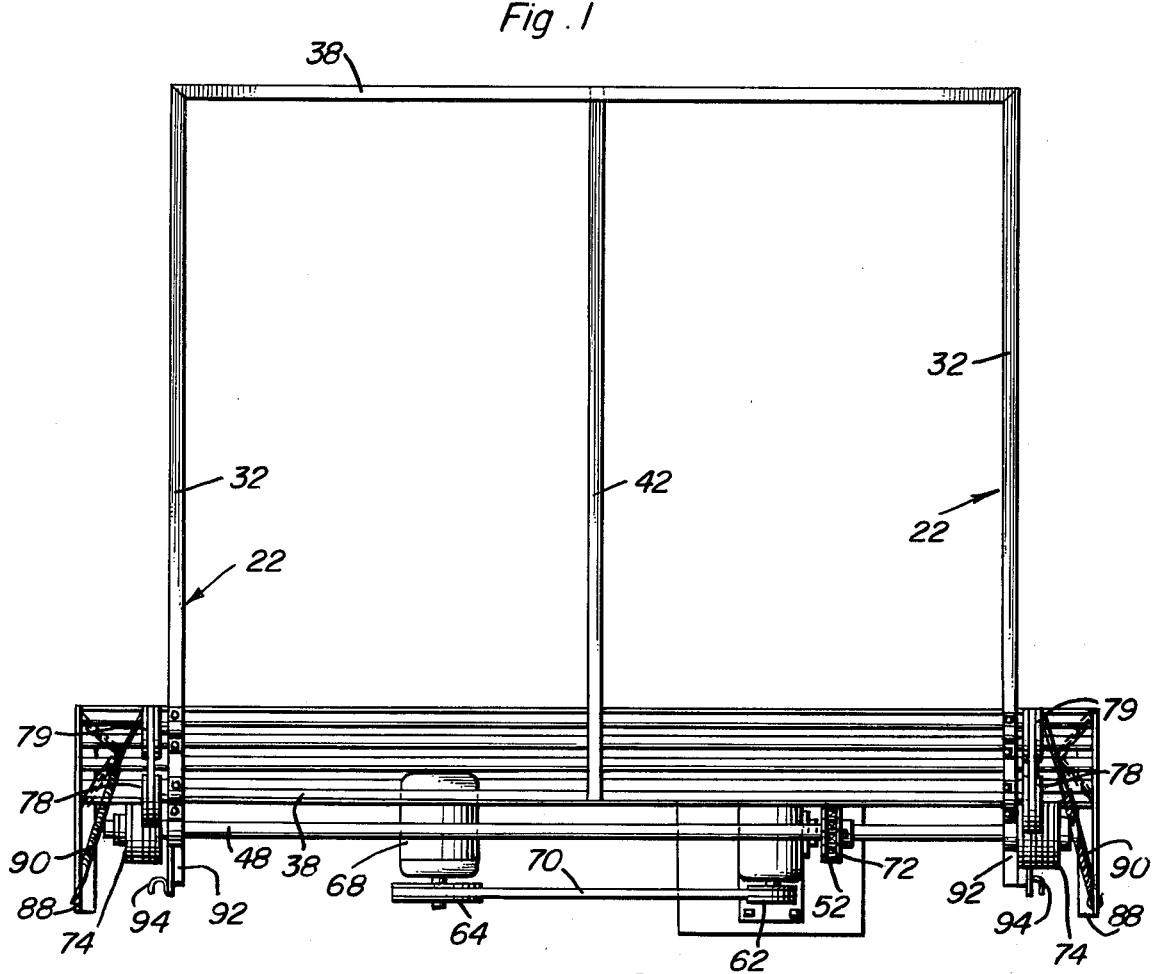
FIG. 1 is a top plan view of the lift of the instant invention.
Figure 2:
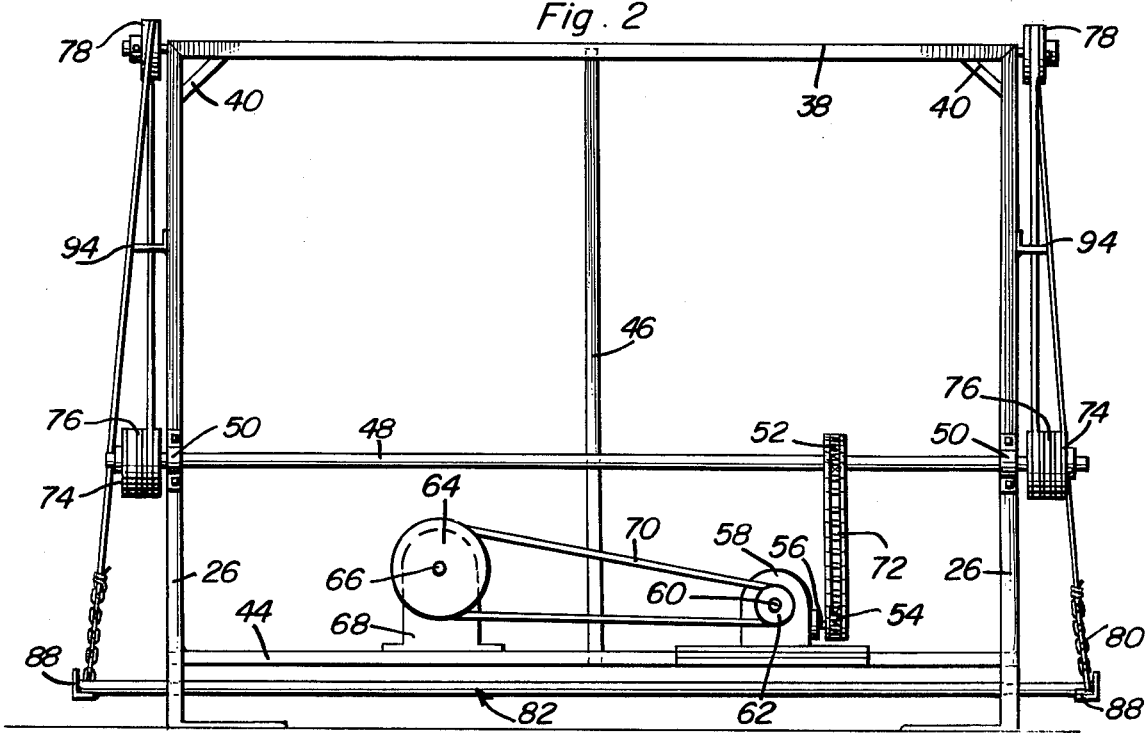
FIG. 2 is a side elevational view of the assemblage illustrated in FIG. 1.

Referring now more specifically to the drawings, the numeral 10 generally designates a side dumping wagon of conventional design including front and rear opposite side wheels 12 and 14. The wagon 10 includes a side dumping gravity discharge hopper 16 equipped with a side discharge chute 18.

Figure 3:
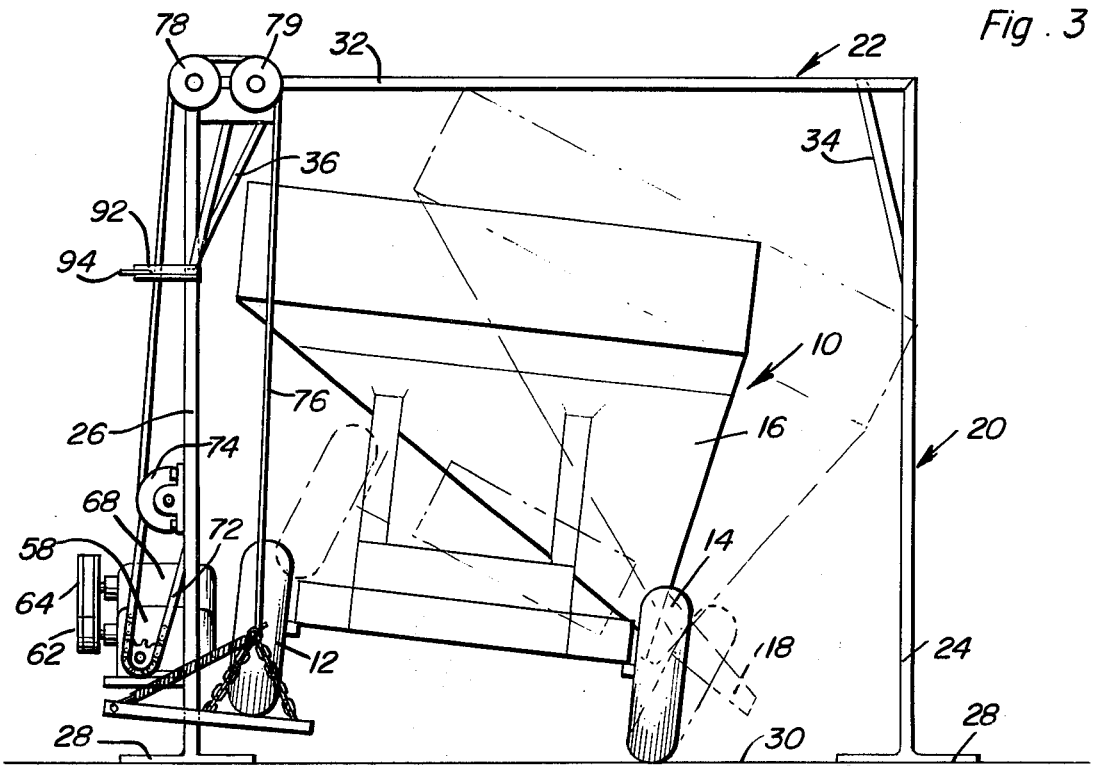
FIG. 3 is an end elevational view of the assemblage illustrated in FIG. 2 as seen from the right side thereof and with a side dumping wagon supported from the lift with its side remote from the gravity discharge chute thereof elevated and a second elevated position of the side dumping wagon illustrated in phantom lines.
Figure 4:
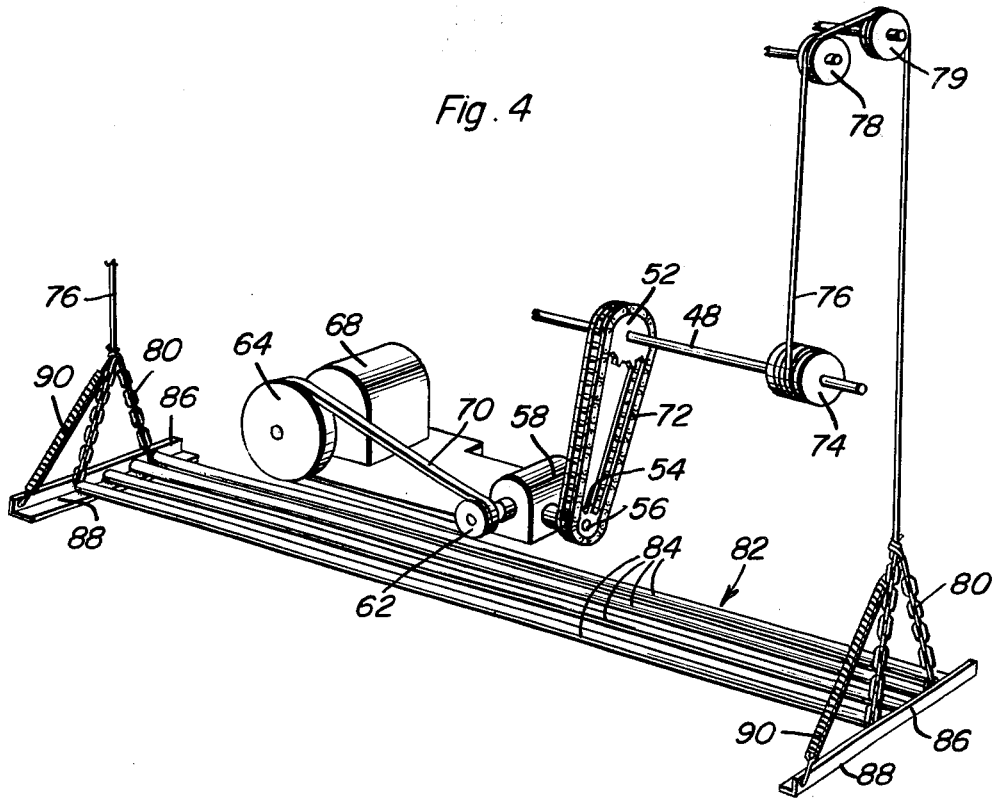
FIG. 4 is a fragmentary perspective view of a major portion of the lifting mechanism of the lift.

From FIG. 3 of the drawings, it may be seen that the hopper body 16 includes bottom wall portions which are inclined downwardly toward the discharge chute 18 whereby a granular or other fluent load within the hopper body 16 may be readily discharged therefrom by gravity through the discharge chute 18.

The lift of the instant invention is referred to in general by the reference numeral 20 and includes a pair of inverted U-shaped opposite end frames referred to in general by the reference numeral 22. The frames 22 include opposite side upstanding legs 24 and 26 equipped with lower end horizontally enlarged foot members 28 for engagement with the ground 30. The upper ends of the legs 24 and 26 of each frame 22 are interconnected by means of an upper horizontal bight portion 32 extending therebetween an having its opposite end portions braced relative to lower portions of the legs 24 and 26 by means of inclined braces 34 and 36.

An upper horizontal longitudinal member 38 extends between and is secured to the upper ends of each pair of corresponding legs 24 and 26 and the opposite ends of each member 38 are braced relatively to the corresponding legs by means of diagonal braces 40. Still futher, an upper horizontal transverse member 42 extends between and is secured to the mid-portions of the longitudinal members 38.

The lower end portions of each pair of legs 24 and 26 are interconnected by means of a lower longitudinal member 44 extending and secured therebetween. Still further, the central longitudinal portion of each longitudinal member 38 and the corresponding longitudinal member 44 are interconnected by means of an upstanding brace member 46 extending and secured therebetween.

A horizontal longitudinal shaft 48 extends between the legs 26 and has its opposite end portions journaled from journal blocks 50 supported from the legs 26. The shaft 48 has a sprocket wheel 52 mounted thereon between the journal blocks 50 and the sprocket wheel 52 comprises a driven sprocket wheel aligned with a drive sprocket wheel 54 carried by the output shaft 56 of a gear reduction assembly 58 supported from the longitudinal member 44 beneath the sprocket wheel 52. The gear reduction assembly 58 includes an input shaft 60 upon which a pulley 62 is mounted and the pulley 62 is aligned with an output pulley 64 mounted on the output shaft 66 of an electric motor 68 mounted on the longitudinal member 44 extending between the legs 26. An elongated flexible belt 70 drivingly connects the pulley 64 with th pulley 62 and an endless chain 72 drivingly connects the sprocket wheel 54 to the sprocket wheel 52.

The opposite ends of the shaft 48 extend outwardly beyond the remote sides of the legs 26 and have winding drums 74 mounted thereon for rotation therewith. Each of the drums 74 has one end portion of an elongated flexible tension member 76 secured thereto for winding thereon and the upper end of each frame 22 has pair of horizontally aligned wheels 78 and 79 journaled therefrom. The free end of each tension member 76 extends upwardly and is trained over the corresponding pulley wheels 78 and 79 and then depends downwardly from the corresponding pulley wheel 79 and has an inverted V-shaped chain bridle 80 supported from its lower end.

An elongated lift member referred to in general by the reference numeral 82 is provided and consits of four transversely spaced tubular members 84 disposed in horizontally spaced apart parallel reaction. Corresponding ends of the tubular member 84 are secured to opposite end transverse angle members 86 of the lift member 82 and the lift member 82 extends between the frames 22 immediately inwardly of the legs 26. The lift member 82 is of sufficient length to project endwise outwardly of the remote sides of the frames 22 and the angle members 86 include corresponding extended end portions 88 which project outwardly of the sides of the legs 26 remote from the legs 24. The free ends of the bridle members 80 are anchored to the angle members 86 at points spaced therealong and a coiled tension spring 90 is provided at each end of the lift member 82 and has one end thereof connected to the free end of the corresponding end portion 88 and the other end connected to the upper end of the corresponding inverted V-shaped bridle 80. Additionally, each of the legs 26 includes an upper end outwardly projecting support 92 including an outwardly opening 94.

In operation, the wagon 10 is pulled by means of a farm tractor (not shown) or other suitable vehicle into the lift 20 with the side wheels 12 rolled up onto the lift member 82 from one end thereof. When the lift member 82 is disposed on the ground 30 and the tension members 76 are untensioned, the coiled springs 90 pull the bridles 80 toward the free end of the end portions 88 thereby freeing both ends of the lift member 82 to receive the wheels 12 of the wagon 10 thereon. Inasmuch as the end portions 88 project outwardly beyond the sides of the legs 26 remote from the legs 24 and are disposed on the remote sides of the legs 26, the end portions 88 may engage the lower ends of the legs 26 to prevent lengthwise shifting of the lift member 82 as the wheels 12 of the wagon 10 are rolled up onto the lift member 82. Additionally, before the wagon 10 is rolled on to the lift member 82, the upper portions of the tension members 76 extending upwardly from the bridles 80 to the pulleys 79 are outwardly deflected and engaged with the hooks 94. Thus, movement of the wagon 10 on to the lift member 82 is not interferred with by the tension members 76 or the bridles 80.

After the wagon 10 has has its wheels 11 positioned on the lift member 82, the discharge chute of wagon 10 may be opened by the operator of the tractor. Thereafter, the operator of the tractor may cause the motor 80 to be operated after disengaging the tension members 76 from the hooks 94. Operation of the motor 68 will then cause the lift member 82 to be elevated to the desired position and the wagon 10 to be tilted to the phantom-line position thereof illustrated in FIG. 3. Of course, the wagon discharge chute 18 was initially opened before the tension members 76 were disengaged from the hooks 94 and the motor 68 was placed in operation. Thus, no wasted time on the part of the operator of the tractor 10 has yet occured.

As the wagon 10 is fully emptied by gravity, the operator of the tractor may then again actuate the motor 68 for operation in the opposite direction whereby the lift member 82 will be returned into engagement with the ground 76 and the compression springs 90 will pull the bridles 80 toward the outer side of the lift 20. Thereafter, operation of the motor 68 may be terminated and the operator of the tractor may again engage the tension members 76 with hooks 94 before again mounting his tractor and pulling the wagon 10 from the lift member 82. Thus, operation of the lift 20 by the operator of a tractor pulling the wagon 10 requires only a small additional amount of time of the operator of the tractor. Of course, this small additional amount of time is considerably less than which would be required if the operator of the tractor had to knock grain or other granular material from position clinging to the inner surfaces of the bottom walls of the hopper body 16.

The foregoing is considered as illustrative only of the principles of the invention. Further, since numerous modifications and changes will readily occur to those skilled in the art, it is not desired to limit the invention to the exact construction and operation shown and described, and accordingly all suitable modification and equivalents may be resorted to, falling with the scope of the invention.

What is claimed as new is a follows:

1. A side lift for side dumping wagons of the type including opposite side front and rear wheels, said lift including upstanding support means having a pair of horizontally spaced elevated support portions, a pair of depending flexible tension members freely dependingly supported from said support portions and disposed in an upstanding plane spaced horizontally outwardly from one side of the lower end portion of said support means, an elongated horizontal lift member spaced horizontally outwardly from said one side of said support means, the lower ends of said tension members being anchored to opposite end portions of said lift member for support thereof solely from said tension members, force means connected between said support means and said tension members for selectively and equally elevating and lowering the lower ends of said tension members relative to said support portions, said lift member being adapted to have the adjacent side front and rear wheels of a side dumping wagon spaced outwardly of said one side of said support means roll thereonto from one end thereof and thereoff from the other end thereof when said lift member is disposed at least substantially at ground level.

2. A side lift for side dumping wagons of the type including opposite side front and rear wheels, said lift including upstanding support means having a pair of horizontally spaced elevated support portions, a pair of depending tension members supported from said support portions and disposed in an upstanding plane spaced horizontally outwardly from one side of the lower end portion of said support means, an elongated horizontal lift member spaced horizontally outwardly from said one side of said support means, at least the lower ends of said tension members being flexible and anchored to opposite end portions of said lift member, force means connected between said support means and said tension members for selectively and equally elevating and lowering the lower ends of said tension members relative to said support portions, said lift member being adapted to have the adjacent side front and rear wheels of a side dumping wagon spaced outwardly of said one side of said support means roll thereonto and thereoff when said lift member is disposed at least substantially at ground level, a pair of opposite end anchor portions projecting horizontally outwardly from the side of said lift member adjacent said support means, and elongated tension springs anchored at one pair of corresponding ends to the outer ends of said outwardly projecting anchor portions and at the other pair of corresponding ends to said tension member lower ends at points spaced above said lift member.

3. The combination of claim 2 wherein said lift member includes a plurality of elongated parallel horizontal tubular members and a pair of transverse brace members extending between and secured to the sets of corresponding ends of said tubular members.

4. The combination of claim 3 wherein said outwardly projecting extensions comprise extended end portions of the corresponding ends of said transverse brace members.

5. The combination of claim 2 including a pair of inverted V-shaped flexible bridles anchored to the opposite ends of said lift members, the lower ends of said members being anchored to the upper apex portions of said bridles.

6. The combination of claim 2 wherein said support means comprises a pair of horizontally spaced uprights, said lift member extending along a path extending between and disposed outwardly of corresponding sides of said uprights.

7. The combination of claim 6 wherein said uprights include upper end pulley wheels journaled therefrom, said tension members comprising elongated flexible tension members trained over said pulley wheels, a winding shaft extending between and journaled from upper portions of said uprights below said pulley wheels, said tension members being anchored to the opposite end portions of said shaft for winding theron, said force means including means for applying rotational torque to said winding shaft.

8. A side lift for side dumping wagons of the type including opposite side front and rear wheels, said lift including upstanding support means having a pair of horizontally spaced elevated support portions, a pair of depending tension members supported from said support portions and disposed in an upstanding plane spaced horizontally outwardly from one side of the lower end portion of said support means, an elongated horizontal lift member spaced horizontally outwardly from said one side of said support means, at least the lower ends of said tension members being flexible and anchored to opposite end portions of said lift member, force means connected between said support means and said tension members for selectively and equally elevating and lowering the lower ends of said tension members relative to said support portions, said lift member being adapted to have the adjacent side front and rear wheels of a side dumping wagon spaced outwardly of said one side of said support means roll thereonto and thereoff when said lift member is disposed at least substantially at ground level, said support means comprising a pair of horizontally spaced uprights, said lift member extending along a path extending between and disposed outwardly of corresponding sides of said uprights, said lift member including a pair of opposite end horizontally transversely outwardly projecting portions, and elongated tension springs anchored at one pair of corresponding ends to the outer ends of said outwardly projecting portions and at the other pair of corresponding ends to said tension members at points spaced closely above said lift member.

9. The combination of claim 8 wherein said outwardly projecting portions are disposed closely outwardly of remote sides of said uprights.

* * * * *